United States Patent

Muthusamy et al.

[11] Patent Number: 5,805,771
[45] Date of Patent: Sep. 8, 1998

[54] AUTOMATIC LANGUAGE IDENTIFICATION METHOD AND SYSTEM

[75] Inventors: Yeshwant K. Muthusamy, Plano; Lorin P. Netsch, Allen; Periagaram K. Rajasekaran, Richardson; Barbara J. Wheatley, Plano, all of Tex.

[73] Assignee: Texas Instruments Incorporated, Dallas, Tex.

[21] Appl. No.: 263,964

[22] Filed: Jun. 22, 1994

[51] Int. Cl.$^6$ .................................................... G01L 9/00
[52] U.S. Cl. ...................... 395/2.41; 395/2.4; 395/2.65; 395/2.66; 395/2.64
[58] Field of Search ............... 395/2, 2.41, 2.65, 395/2.68, 2.11

[56] References Cited

U.S. PATENT DOCUMENTS

| | | | |
|---|---|---|---|
| 4,829,577 | 5/1989 | Kuroda et al. | 381/45 |
| 5,150,449 | 9/1992 | Yoshida et al. | 395/2 |
| 5,175,793 | 12/1992 | Sakamoto et al. | 395/2 |
| 5,241,619 | 8/1993 | Schwartz et al. | 395/2 |
| 5,278,911 | 1/1994 | Bickerton | 395/2.41 |
| 5,307,444 | 4/1994 | Tsuboka | 395/22 |
| 5,479,563 | 12/1995 | Yamaguchi | 395/2.41 |

OTHER PUBLICATIONS

Yeshwant K. Muthusamy, A Segmental Approach to Automatic Language Identifcation, Center for Spoken Language Understanding, Oregon Graduate Institute, Technical Paper No. CSLU 93–002, Nov. 1993, pp. 1–241.

Yeshwant K. Muthusamy, Ronald A. Cole, Beatrice T. Oshika, The OGI Multi–Language Telephone Speech Corpus, Center for Spoken Language Understanding, Oregon Graduate Institute of Science and Technology, pp. 895–898.

Muthusamy et al. [Acoutics, Speech & Signal Processing Conference, ICASSP 1991, pp. 353–356, A Segment–Based Approach to Automatic Lanuage Identification].

Muthusamy [IEEE Communications, Comuters and Signal Processing, 1989, pp. 525–529, "Language Identification With Neural Networks: A Feasibility Study"].

Bahl [IEEE Transaction on Speech and Signal Processing, Jan. 1993, pp. 77–83, "Estimating Hidden Markov Models so as to Maximize Speech Recognition"].

Holmes ["Speech Synthesis and Recognition", Chapman & Hall, 1988, chapter 8, section 8, pp. 143 & 144].

*Primary Examiner*—Allen R. MacDonald
*Assistant Examiner*—Vijay B. Chawan
*Attorney, Agent, or Firm*—Robert L. Troike; W. James Brady, III; Richard L. Donaldson

[57] ABSTRACT

This invention consists of three enhancements to HMM-based automatic language identification systems. The three enhancements are: (i) language-discriminant acoustic model training and recognition, (ii) an acoustic model pruning procedure that picks only those phonetic models which are considered useful for language identification, and (iii) a neural network-based language classification method that uses knowledge-based features derived from phone sequences output by the HMM phonetic recognizers.

16 Claims, 1 Drawing Sheet

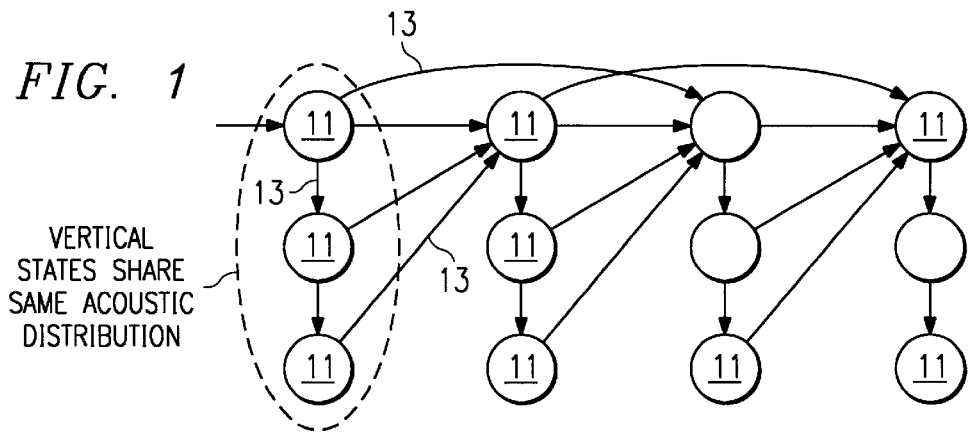
FIG. 1
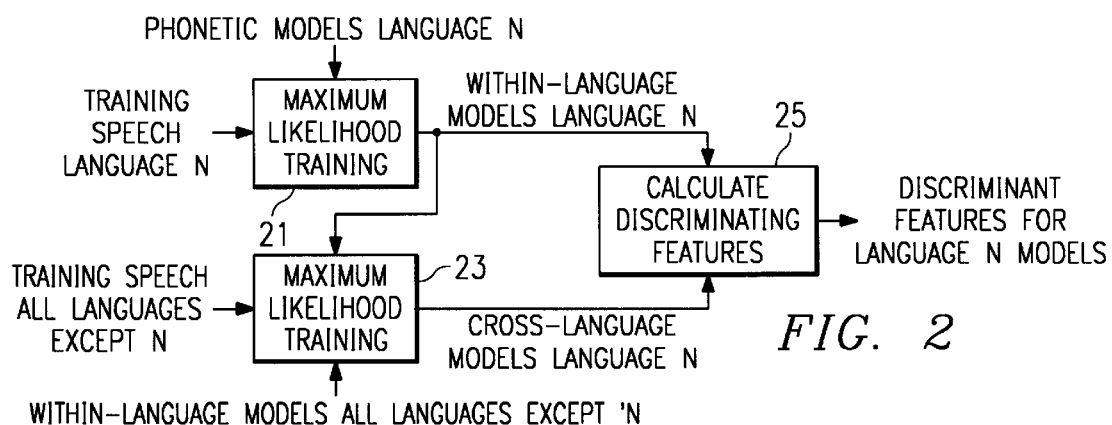
FIG. 2
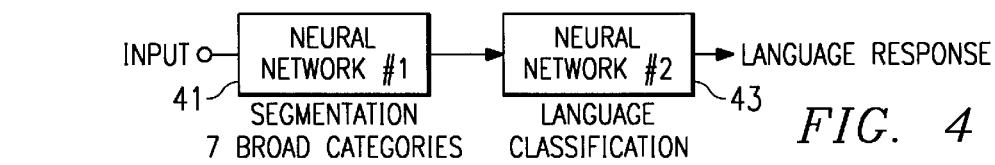
FIG. 3
FIG. 4

5,805,771

AUTOMATIC LANGUAGE IDENTIFICATION METHOD AND SYSTEM

STATEMENT OF INVENTION:

This invention relates to speech recognition and more particularly to automatic language identification.

BACKGROUND OF THE INVENTION

Automatic language identification is the problem of identifying the language of the speaker using short excerpts of speech, regardless of the content of the speech. In a rapidly shrinking global community, this technology could be of immense use to telephone companies that strive to cater to an increasingly multilingual customer population. For example, a Japanese businessman with little knowledge of English might have trouble making hotel reservations. But an automatic language identification system would route his call to a Japanese-speaking operator who could assist him. Automatic language identification systems could even save lives in emergency situations. 9-1-1 dispatchers across the U.S. have found AT&T's Language Line Service invaluable in responding to distress calls from non-English speaking segments of the population. The service provides quick access to human translators and interpreters by an English-speaking operator familiar with several foreign languages. Currently, the service is completely operated by humans. An automatic language identification system would increase the accuracy and reliability of such a service.

Present art systems provide moderate ability to identify the language of the speaker, but suffer because the systems are not based on statistical decision methods that are optimized to discriminate between languages. In our invention, we provide a means to optimize performance of language identification by statistical methods.

Although there has been work done in automatic language identification starting as early as 1973, applicants found less than 20 published reports on automatic language identification in the period 1973–1993. Several approaches have been evaluated. The data have spanned the range from phonetic transcriptions of text, laboratory-quality speech, to telephone and radio speech. The number of languages has varied from three to twenty. The approaches to language identification have used "reference sounds" in each language, segment-and syllable-based Markov models, pitch contours, formant vectors, acoustic features, broad phonetic, and prosodic features and just raw waveform features. A variety of classification methods have been tried, including Hidden Markov Models (HMMs), expert systems, Vector Quantization (VQ), clustering algorithms, quadratic classifiers, and artificial neural networks.

There has been a resurgence in automatic language identification research over the past two years with the advent of a public-domain multilingual telephone speech corpus. At the 1994 Language Identification Review and Evaluation Meeting conducted by National Institute Standards and Technology (NIST), there were several studies on automatic language identification that were all based on the following approach:

develop a phonetic recognizer for each language; and
   combine the acoustic likelihood scores from the recognizers to determine the highest scoring language.

None of these approaches investigated which of the acoustic models used in the recognition were actually helping or hurting the identification.

SUMMARY OF THE INVENTION

In accordance with one preferred embodiment of the present invention, we apply discriminant acoustic model training and recognition methods to language identification. We use the training data collected for each language to determine acoustic speech feature representations. These representations are based on the statistics of speech features in each language and provide improved discrimination between the phonetic elements of a given language and all other languages.

In accordance with a second embodiment of the present invention, we precede the combination of acoustic likelihoods by a model selection procedure that eliminates those models that are deemed useless for identification of the languages in question.

In accordance with another embodiment of the present invention, feature measurements made on the phone sequence obtained from the recognizers are followed by neural network classification of the languages using these features as input. Examples of phone sequence-based features include: frequency of occurrence of pairs and triples of phones, and duration statistics of phones and phone sequences.

DESCRIPTION OF DRAWING

FIG. 1 illustrates phonetic element HMM structure;

FIG. 2 is a block diagram of system for language model creation;

FIG. 3 is a block diagram of a language identification system according to one embodiment of the present invention; and FIG. 4 is a block diagram a language classification system in accordance with an embodiment of the present invention.

DESCRIPTION OF PREFERRED EMBODIMENT

The first step of the method is to form models for each of the phonetic elements of the speech in each individual language. It should be noted that the phonetic elements will not be the same for each language. In the preferred embodiment, we implement the models as phonetic Hidden Markov Models (HMMs) for each language as determined by characteristics of the language. The phonetic element HMM structure consists of finite duration HMMs similar to that shown in FIG. 1, where states are represented by circles 11 and transitions between states by lines 13. In the preferred embodiment, each set of states that are vertically aligned share an acoustic statistical distribution, which is assumed to be a single multivariate Gaussian density and represents the acoustic speech signal corresponding to the states of the HMM. While the preferred embodiment uses HMM modeling and single multivariate Gaussian acoustic statistical models, other methods of modeling language phonetic elements and acoustic statistics are well-known in the art and may be used.

After the HMM models for a language (Language N) are created, we train the models using a speech corpus containing samples of speech from that language (Language N), as shown at block 21 at the top of FIG. 2. In the preferred embodiment, training uses a maximum-likelihood estimation procedure. Other training methods well-known in the art may be used. The result of training is a set of phonetic element HMM models representing the statistics of the phonetic elements of each language, and are termed the within-language HMM models. For example, phonetic models of Japanese are trained using training speech in Japanese.

As a novel aspect of our invention, after the within-language phonetic HMM models are created for each language, we create a second set of models in block 23 for each language. These models are created, as shown in FIG. 2, by training the existing within-language HMM models for each language using the speech corpora and models for all languages except the language (Language N) used to create the original within-language HMM models. The training may use the same training methods as the within-language HMM models or may use discriminative training based on training data where confusion between models for Language N and the correct models exists. We term the resulting HMM models the cross-language models (for Language N for example), and they represent the statistics where the within-language models of Language N are confusable with all other language models. For example, if the within-language models are for Japanese, the training speech and models applied to block 23 are from all other languages used in the system such as English, French, German, Tamil, Spanish, etc., except Japanese.

Once the training of both within-language and the corresponding cross-language models is complete for each language in the system, we have available corresponding acoustic statistical distributions for the within-language and cross-language models. The corresponding distributions are subjected to simultaneous diagonalization, a procedure well-known in the art, to determine the acoustic features for each state of each model that optimally discriminate the within-language acoustic distribution from the cross-language distribution. Simultaneous diagonalization is a mathematical algorithm often used in pattern recognition. Given two Gaussian distributions with mean and covariance, the algorithm chooses a subset of optimal features by:

1. Whitening the within-class distribution by doing an eigenvector decomposition of the within-class covariance to define the whitening linear transformation.
2. Applying the whitening linear transformation to the confusion-class covariance (in our case this is the cross-language statistics) to come up with a transformed confusion-class covariance.
3. Performing a second eigenvector decomposition of the transformed confusion class covariance.
4. Combining the whitening linear transformation of 1. with the eigenvector decomposition of 3. to define an optimal transformation.
5. Selecting the resulting features with largest eigenvalues as indicated in 3.

On the basis of this, we use the optimal discriminative acoustic features for each HMM of each language to calculate at block 31 the likelihood that unknown speech is from each language.

In the preferred embodiment, this is implemented as a set of maximum-likelihood HMM recognizers $31a$–$31n$ in FIG. 3 each using the HMMs and optimal features for each language. Other implementations of likelihood well-known in the art may be used. Given input speech at 30 in an unknown language, we process the input speech using each recognizer $31a$–$31n$, and determine the likelihood that the speech came from the phonetic elements of each language. Each phoneme is given a likelihood score at the output of the recognizer and the post processor 33 includes a counter for counting each of these values. The highest score becomes the selected language.

As another novel aspect of our invention, we prune the set of HMM phonetic models used in determining the language likelihood. We use the training data from each language to calculate the language identification likelihood, as described above. From the statistics of the resulting likelihood scores for each phonetic HMM, we determine the HMM phonetic models which provide likelihood information that is useful to identify a language. Those HMM models that do not provide useful information are cataloged, and are subsequently not used to provide language identification information.

As another novel aspect of our invention, we use the sequences of phones output by the phonetic recognizers for each language to compute several features, which are then fed into a neural network classifier that performs the language classification. This is an extension of a knowledge-based approach to automatic language identification described in a doctoral dissertation by one of the inventors Yeshwant Muthusamy titled "A Segmental Approach to Automatic Language Identification," PhD thesis, Oregon Graduate Institute of Science & Technology, 1993. As described in this dissertation, the speech input is segmented into seven broad phonetic categories: vowel, stop, fricative, closure, pre-vocalic sonorant, inter-vocalic sonorant, and post-vocalic sonorant. The first four categories are standard broad phonetic classes, with closure representing both stop-closures and silence. The latter three categories represent the weak sonorants, such as nasals (|m|,|n|), liquids (|l|,|r|) and glides (|w|,|y|). The terms pre-vocalic, inter-volcalic and post-vocalic refer to the position of the weak sonorants relative to vowels (i.e., before a vowel, between two vowels, and after a vowel, respectively). In accordance with one aspect of the present invention herein, this segmentation and broad classification is done by the first neural network 41 shown in FIG. 4. A number of phonetic and prosodic features are computed on the sequence of broad phonetic categories output by the first neural network. These features are fed into a second neural network 43 that performs the language classification. Examples of such features include: frequency of occurrence of pairs and triples of phones, duration statistics of phones, phone-pairs and phone-triples, ratios of occurrence of phones with respect to each other, and so on. The features are chosen by visual inspection of histogram plots that show the discriminative ability of these features. The number of features used and the number of languages to be classified determines the architecture of the network.

We claim:

1. A method of automatically identifying a language among a plurality of languages comprising the steps of:
    forming models for each of the phonetic elements of the speech in each individual language to be identified;
    after models for a language are created, training the models using a speech corpus containing samples of speech from that language to form within-language models;
    training models for each language using the speech corpora and models for said plurality of languages except the language used to create the original within-language models to form cross-language models;
    determining acoustical features for each state of each model to optimally discriminate within-language acoustic distribution from cross-language distribution; and
    identifying a language from input speech based on said acoustical features.

2. The method of claim 1 wherein said forming step includes forming Hidden Markov Models for phones for each language.

3. The method of claim 2 wherein said Hidden Markov Models structure consists of states and transitions between states where each set of states that are vertically aligned share an acoustical statistical distribution which is a single multivariate Gaussian density.

4. The method of claim 2 wherein the step of training within-language models includes training using maximum-likelihood estimation procedures to produce a set of phonetic element HMMs representing statistics of the phonetic elements of each language.

5. The method of claim 4 wherein said step of training to form cross-language models includes the step of discriminative training using within-language HMMs for each language, to produce both within-language and corresponding cross-language models and to provide corresponding acoustical statistical distributions for the within-language and cross-language models.

6. The method of claim 5 wherein said determining step includes diagonalization of said statistical distributions to determine acoustical features for each state of each model to optimally discriminate the within-language model statistical distribution from the cross-language model statistical distribution.

7. The method of claim 6 wherein the identifying step includes the step of determining the likelihood that unknown speech is from each language by the steps of; processing input speech in an unknown language in a recognizer for each language and determining likelihood that speech came from the phonetic elements of each language.

8. The method of claim 7 wherein said calculating step includes the step of providing a set of maximum-likelihood HMM recognizers, each using the HMMs and optimal features for each language.

9. The method of claim 6 further including the step of pruning the set of HMM phonetic models used in determining the language identification likelihood from the statistics of the resulting likelihood scores for each phonetic HMM.

10. The method of claim 7 wherein said identifying step includes the step of determining features based on sequences of phones output by the recognizers.

11. The method of claim 10 wherein said features include frequency of occurrence of pairs and triples of phones, duration statistics of phones, phone-pairs and phone-triples, ratios of occurrence of phones with respect to each other.

12. The method of claim 11 wherein said identifying step includes the step of feeding the features computed on the sequence of phones output by the recognizers into a neural network that performs language classification.

13. A system for identifying an input natural language comprising:

a phonetic recognizer responsive to input speech for providing sequences of phones for a plurality of natural languages;

means coupled to said recognizer for knowledge-based selection and computation of features specifically designed to distinguish between natural languages based on said sequences of phones; and a neural network responsive to said features for identifying a natural language from among a plurality of natural languages.

14. A method of automatically identifying a language among a plurality of languages comprising the steps of:

forming models for each of the phonetic elements of the speech in each individual language to be identified;

after models for a language are created, training the models using a speech corpus containing samples of speech from that language to form within-language model;

training models for each language using the speech corpora and models for said plurality of languages except the language used to create the original within-language models to form cross-language models;

determining acoustical features for each state of each model to optimally discriminate within-language acoustic distribution from cross-language distribution; and identifying a language from input speech based on said acoustical features wherein said identifying step includes said step of determining the likelihood that unknown speech is from each language by processing input speech in an unknown language in a recognizer for each language and determining likelihood that speech came from the phonetic elements of each language.

15. The method of claim 14 wherein said identifying step includes the step of determining features based on sequences of phones output by the recognizers.

16. The method of claim 15 wherein said features include frequency of occurrence of pairs and triples of phones, duration statistics of phones, phone-pairs and phone-triples, ratios of occurrence of phones with respect to each other.

* * * * *